UNITED STATES PATENT OFFICE.

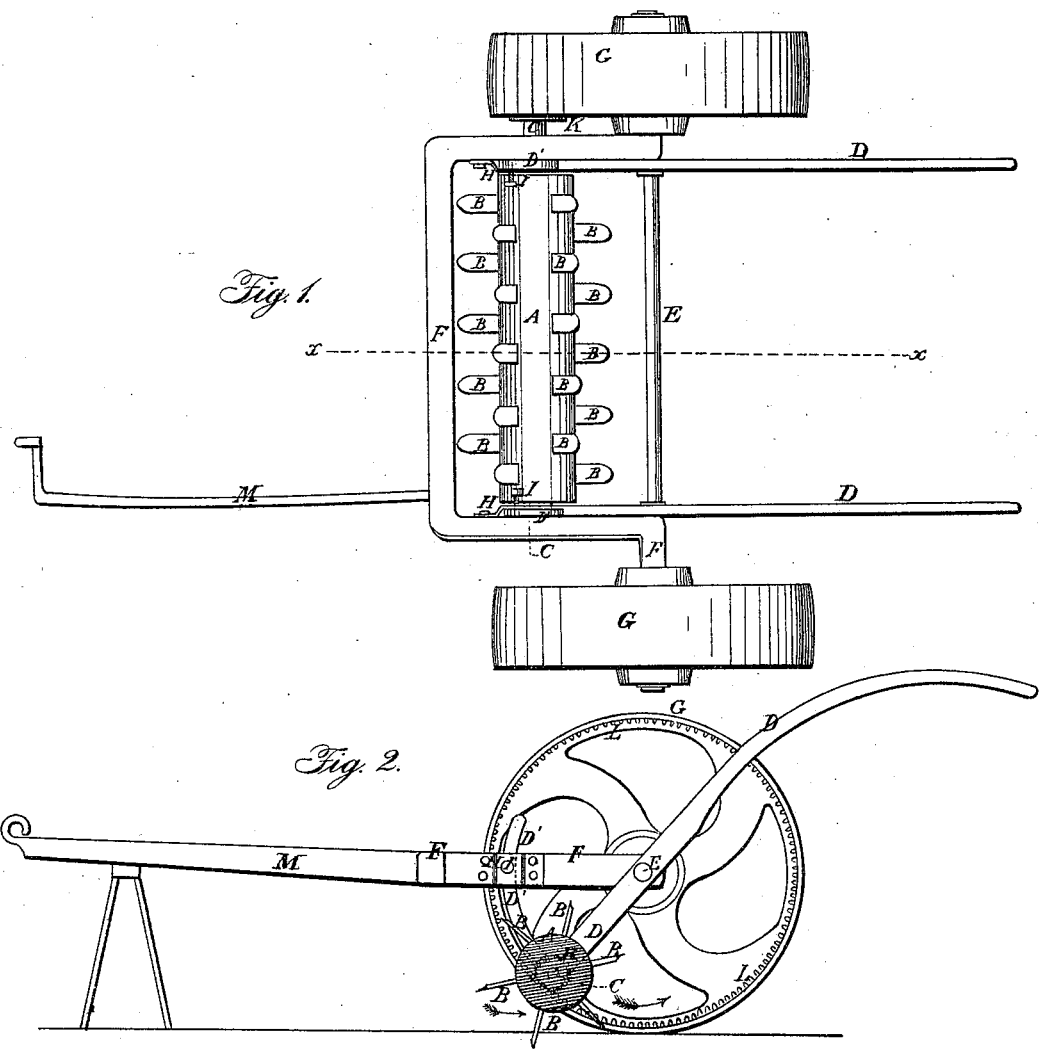

ASHLEY CRAFTS AND EBENEZER WEEKS, OF AUBURN, OHIO.

IMPROVEMENT IN CULTIVATORS.

Specification forming part of Letters Patent No. 6,997, dated January 8, 1850.

*To all whom it may concern:*

Be it known that we, ASHLEY CRAFTS and E. WEEKS, of Auburn, in the county of Geauga and State of Ohio, have invented a new and useful Improvement in Rotary-Cylinder Cultivators, which is described as follows, reference being had to the annexed drawings of the same, making part of this specification.

Figure 1 is a plan. Fig. 2 is a vertical longitudinal section on the line $x\ x$ of Fig. 1.

Similar letters in the several figures refer to corresponding parts.

This cultivator consists of a rotary cylinder, A, armed with six or more rows of teeth, B, arranged in straight lines parallel with its axis, the teeth of one row being arranged opposite the spaces between the teeth of the next adjacent rows, as is seen in the common cylindrical harrow, having an axle, C, passing through its center and extending beyond its ends through boxes or bearings in the lower curved portions of two parallel levers or handles, D D, made somewhat like the handles of a cultivator or plow, but turning upon a horizontal bar, E, (which serves as the fulcrum of each lever,) inserted into the elbows of a crank-axle, F, in a line coincident with the axis of said crank-axle F, and the centers of two large sustaining and propelling wheels, G, arranged on the wrists of the crank-axle, said curved levers or handles being designed to elevate or depress one or both ends of the rotary cultivator to avoid a stump or a stone or other obstruction, and also to assist in confining the cultivator in its required position in relation to the other parts of the machine, the lower arms of said levers D being bent upward, forming segments D' of a circle of a radius equal to the distance from the fulcrum E to the axis C of the rotary-cylinder cultivator, said segments passing through boxes H, secured to the crank-axle F, and thus prevent the cultivator A moving endwise to the right or to the left, and allow the cultivator A to rise and fall in the arc of a circle scribed from the center of the bar E or fulcra of the lever D. By securing these segments in the boxes H with screws I or other means, the cultivator may be held in any required position, either upon the ground or above it. One end of the axle of the cultivator is extended beyond the inner face of one of the propelling-wheels, having on said end a pinion, K, which gears into a circle of cogs, L, formed on the inner periphery of the propelling-wheel G. This pinion remains always in gear with the propelling-wheel G, whether one or both ends of the cultivator A be raised. The axis of the rod E or fulcra of the arms D of the cultivator and the centers of the propelling-wheels being coincident, of course the cultivator will be turned with a positive motion whenever the propelling-wheels revolve, and these will always revolve when the machine is drawn forward by the beast of draft geared to it, as the wheels are made sufficiently heavy to create sufficient adhesiveness to the ground for that purpose. The bend in the crank-axle must be sufficiently long and broad to permit the cultivator to rise and fall without touching it.

If one horse only is employed to draw the cultivator and its appendages, the tongue M to which he is attached should be fixed to the crank-axle nearly on a line with one of the handles D; but if two horses should be used the tongue should be affixed to the middle of the crank-axle. One of the wrists F' of the crank-axle F is made longer than the opposite one, in order to leave space between the sustaining-wheel G and the end of the cultivator to pass over the row of corn or other plants under cultivation without touching the same.

The rotary cylinder may be made hollow, of separate staves, into which the teeth B are inserted, and secured by screws on their shanks and nuts inside the cylinder, so that their angles with the axis of the cylinder may be changed at pleasure, so as to throw the earth toward or from the row of corn at pleasure, or to change the teeth for others when desired.

The pinion and circular row of cogs may be dispensed with and simply a pulley and plain rim employed to turn the cultivator, the periphery of the pulley being made to bear against the under surface of the rim of the propelling-wheel with sufficient adhesiveness to turn the several parts.

When this machine is employed to loosen the earth between the rows of Indian corn the horse is guided between two of them, so as to bring the rotary cultivator A on one side of a row and the uncogged sustaining-wheel on the opposite side. He is then driven forward in a line parallel with the row, while the attendant, who has hold of the handles, is always in readiness to bear down the long end of either lever when he sees an obstruction in front which renders it necessary to raise either end or the whole of the cylinder from the ground in order to pass by the same without touching it; and when he finds that the ground is so very tough and hard as to require an additional pressure of the cylinder of cultivator-teeth in order to pulverize the same, he raises the long arms of the levers, which depresses the short arms in which the axles of the cultivator turn in the arc of a circle, thus causing the teeth to penetrate more deeply into the earth.

The cylinder may be divided at the middle and be provided with short axles and two additional levers, in which case each cylinder would have to be furnished with a pinion or pulley to be geared to the propelling-wheel next to it.

Having thus fully described our improved cultivator, we hereby declare that we do not claim to be the original inventors of any of the individual parts of this wheeled rotary cylindrical cultivator; but

What we do claim is—

The combination of the levers D, roller A, and driving-wheel G, in the manner and for the purpose set forth.

In testimony whereof we have hereunto signed our names before two subscribing witnesses.

ASHLEY CRAFTS.
EBENEZER WEEKS.

Witnesses:
  WM. L. P. ELLIOTT,
  A. E. H. JOHNSON.